US010763004B2

(12) United States Patent
Yust et al.

(10) Patent No.: US 10,763,004 B2
(45) Date of Patent: Sep. 1, 2020

(54) CONDUCTIVE POLYMERIC MATERIAL

(71) Applicant: 3M INNOVATIVE PROPERTIES COMPANY, St. Paul, MN (US)

(72) Inventors: David T. Yust, Woodbury, MN (US); Onur Sinan Yordem, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 515 days.

(21) Appl. No.: 15/124,776

(22) PCT Filed: Mar. 12, 2015

(86) PCT No.: PCT/US2015/020067
§ 371 (c)(1),
(2) Date: Sep. 9, 2016

(87) PCT Pub. No.: WO2015/138667
PCT Pub. Date: Sep. 17, 2015

(65) Prior Publication Data
US 2017/0069405 A1 Mar. 9, 2017

Related U.S. Application Data

(60) Provisional application No. 61/951,869, filed on Mar. 12, 2014.

(51) Int. Cl.
*H01B 1/24* (2006.01)
*C08J 5/18* (2006.01)
*C08L 83/10* (2006.01)
*C08J 3/00* (2006.01)
*C08J 3/20* (2006.01)
*B32B 27/08* (2006.01)
*B32B 27/20* (2006.01)
*B32B 27/28* (2006.01)
*C08L 25/08* (2006.01)
*C08L 83/08* (2006.01)
*C08K 3/04* (2006.01)
*C08L 23/04* (2006.01)
*H01B 1/22* (2006.01)

(52) U.S. Cl.
CPC .............. *H01B 1/24* (2013.01); *B32B 27/08* (2013.01); *B32B 27/20* (2013.01); *B32B 27/283* (2013.01); *C08J 3/005* (2013.01); *C08J 3/203* (2013.01); *C08J 5/18* (2013.01); *C08K 3/04* (2013.01); *C08K 3/041* (2017.05); *C08L 23/04* (2013.01); *C08L 25/08* (2013.01); *C08L 83/08* (2013.01); *C08L 83/10* (2013.01); *H01B 1/22* (2013.01); *B32B 2264/105* (2013.01); *B32B 2264/108* (2013.01); *B32B 2307/202* (2013.01); *C08J 2325/08* (2013.01); *C08J 2383/08* (2013.01); *C08J 2423/08* (2013.01); *C08J 2423/14* (2013.01); *C08J 2425/08* (2013.01); *C08J 2453/00* (2013.01); *C08J 2483/08* (2013.01); *C08K 3/042* (2017.05); *C08K 2201/005* (2013.01); *C08L 2203/16* (2013.01); *C08L 2205/03* (2013.01)

(58) Field of Classification Search
None
See application file for complete search history.

(56) References Cited

U.S. PATENT DOCUMENTS

| | | |
|---|---|---|
| 4,617,353 A | 10/1986 | Myers |
| 5,556,697 A | 9/1996 | Flenniken |
| 5,696,198 A | 12/1997 | Chereisky |
| 5,726,283 A | 3/1998 | Tsai |
| 5,743,304 A | 4/1998 | Mitchell |
| 5,950,541 A | 9/1999 | Nakayama |
| 5,985,181 A | 11/1999 | Yoshida |
| 6,039,896 A | 3/2000 | Miyamoto |
| 6,197,219 B1 | 3/2001 | Foulger |
| 6,284,832 B1 | 9/2001 | Foulger |
| 6,317,540 B1 | 11/2001 | Foulger |
| 6,331,353 B1 | 12/2001 | Foulger |
| 6,331,586 B1 | 12/2001 | Thielen |

(Continued)

FOREIGN PATENT DOCUMENTS

| | | |
|---|---|---|
| DE | 102004011683 | 10/2005 |
| EP | 0971366 | 1/2000 |

(Continued)

OTHER PUBLICATIONS

Calberg, "Electrical and dielectric properties of carbon black filled co-continuous two-phase polymer blends", Journal of Physics D: Applied Physics, 1999, vol. 32, pp. 1517-1525.

(Continued)

Primary Examiner — Ana L. Woodward
(74) Attorney, Agent, or Firm — Clifton F. Richardson

(57) ABSTRACT

A melt-processable conductive material including a first continuous phase, a second continuous phase and a non-continuous phase. The first continuous phase includes a first polymer, the second continuous phase includes a second polymer, and the non-continuous phase includes a third polymer. The second continuous phase is co-continuous with the first continuous phase and the non-continuous phase is substantially contained within the first continuous phase. A plurality of conductive particles is distributed in the first polymer or at a boundary between the first continuous phase and the second continuous phase. The conductive particles form a conductive network.

20 Claims, 5 Drawing Sheets

(56) References Cited

U.S. PATENT DOCUMENTS

| | | |
|---|---|---|
| 6,380,294 B1 | 4/2002 | Babinec |
| 6,576,336 B1 | 6/2003 | LeGrande |
| 6,730,401 B2 | 5/2004 | Jackson |
| 6,767,492 B2 | 7/2004 | Norquist |
| 7,371,464 B2 | 5/2008 | Sherman |
| 7,378,040 B2 | 5/2008 | Luo |
| 7,501,185 B2 | 3/2009 | Watanabe |
| 7,705,101 B2 | 4/2010 | Sherman |
| 7,732,711 B2 | 6/2010 | Ericsson |
| 7,915,370 B2 | 3/2011 | Sherman |
| 7,947,376 B2 | 5/2011 | Sherman |
| 8,063,166 B2 | 11/2011 | Sherman |
| 8,067,094 B2 | 11/2011 | Benson |
| 8,124,877 B2 | 2/2012 | Broman |
| 8,361,626 B2 | 1/2013 | Sherman |
| 9,119,289 B2 | 8/2015 | Kelley |
| 2003/0008209 A1 | 1/2003 | Rahim |
| 2004/0105983 A1 | 6/2004 | Hattori |
| 2004/0211943 A1 | 10/2004 | Okahara |
| 2005/0062023 A1 | 3/2005 | Korzhenko |
| 2007/0012468 A1 | 1/2007 | Han |
| 2007/0117901 A1 | 5/2007 | Suzuki |
| 2007/0205401 A1 | 9/2007 | Terada |
| 2008/0318065 A1 | 12/2008 | Sherman |
| 2010/0025073 A1 | 2/2010 | Fagrell |
| 2011/0042624 A1 | 2/2011 | Minagoshi |
| 2011/0123850 A1 | 5/2011 | Duong |
| 2011/0135936 A1 | 6/2011 | Katsuta |
| 2011/0260116 A1 | 10/2011 | Plee |
| 2011/0281051 A1 | 11/2011 | Dufaure |
| 2011/0281984 A1* | 11/2011 | Garois .................. C08L 91/00 524/168 |
| 2014/0238731 A1 | 8/2014 | Kelley |
| 2014/0364569 A1* | 12/2014 | Kito ........................ C08L 77/02 525/183 |

FOREIGN PATENT DOCUMENTS

| | | |
|---|---|---|
| JP | H11-297122 | 10/1999 |
| JP | 2000-299022 | 10/2000 |
| JP | 2001-357721 | 12/2001 |
| JP | 2003-123538 | 4/2003 |
| JP | 2005-068273 | 3/2005 |
| JP | 2007-025131 | 2/2007 |
| JP | 2007-175931 | 7/2007 |
| KR | 2009-027132 | 3/2009 |
| SE | 9502368 | 6/1995 |
| TW | 326019 | 2/1998 |
| WO | WO 1995-08829 | 3/1995 |
| WO | WO 1995-09198 | 6/1995 |
| WO | WO 2000-24816 | 5/2000 |
| WO | WO 2006-041186 | 4/2006 |
| WO | WO 2007-078713 | 7/2007 |
| WO | WO 2012-046600 | 4/2012 |
| WO | WO 2012-052075 | 4/2012 |

OTHER PUBLICATIONS

Gubbels, "Selective Localization of Carbon Black in Immiscible Polymer Blends: A Useful Tool to Design Electrical Conductive Composites", Macromolecules, 1994, vol. 27, pp. 1972-1974.

Lagrev, "Poly(butylene terephthalate)/ Poly(ethylene-co-alkylacrylate)/ Carbon Black Conductive Connposites: Influence of Composition and Morphology on Electrical Properties", Polymer Engineering and Science, Jul. 2001, vol. 41, No. 7, pp. 1124-1132.

Levon, "Multiple Percolation in Conducting Polymer Blends", Macromolecules, 1993, vol. 26, pp. 4061-4063.

Tchoudakov, "Conductive Polymer Blends With Low Carbon Black Loading: Polypropylene/Polyamide", Polymer Engineering and Science, May 1996, vol. 36, No. 10, pp. 1336-1346.

International Search Report for PCT International Application No. PCT/US2015/020067, dated May 29, 2015, 3pgs.

* cited by examiner

CONDUCTIVE POLYMERIC MATERIAL

BACKGROUND

Polymers can be made conductive by adding conducting particles to the polymer in an amount sufficient to cause percolation. Dissimilar polymers are often immiscible with each other. Immiscible polymers may be blended together to form co-continuous blends and conductive particles may be added to such blends to make the blends conductive. Such filled co-continuous blend can lead to conductivity at a lower concentration of conductive particles compared to a single phase system. However, such materials are often not melt-processable and often have stiffnesses that are too high for many applications. Accordingly, a need exists for a melt-processable, low stiffness conductive blend.

SUMMARY

A conductive material consistent with the present disclosure includes a first continuous phase, a second continuous phase and a non-continuous phase. The first continuous phase includes a first polymer, the second continuous phase includes a second polymer, and the non-continuous phase includes a third polymer. The second continuous phase is co-continuous with the first continuous phase and the non-continuous phase is substantially contained within the first continuous phase. A plurality of conductive particles is distributed in the first polymer or at a boundary between the first continuous phase and the second continuous phase. The conductive particles form a conductive network and the conductive material is melt-processable.

A method of making an article consistent with the present disclosure includes selecting a first polymer, a second polymer and a third polymer such that the first polymer, the second polymer and the third polymer are mutually immiscible; forming a polymer composite by mixing the first polymer with a plurality of conductive particles; blending the polymer composite, the second polymer and the third polymer to form a conductive material; and extruding the conductive material. The conductive material includes a first continuous phase that includes the first polymer, a second continuous phase that includes the second polymer and that is co-continuous with the first continuous phase, and a non-continuous phase that includes the third polymer. The conductive particles form a conductive network.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1:
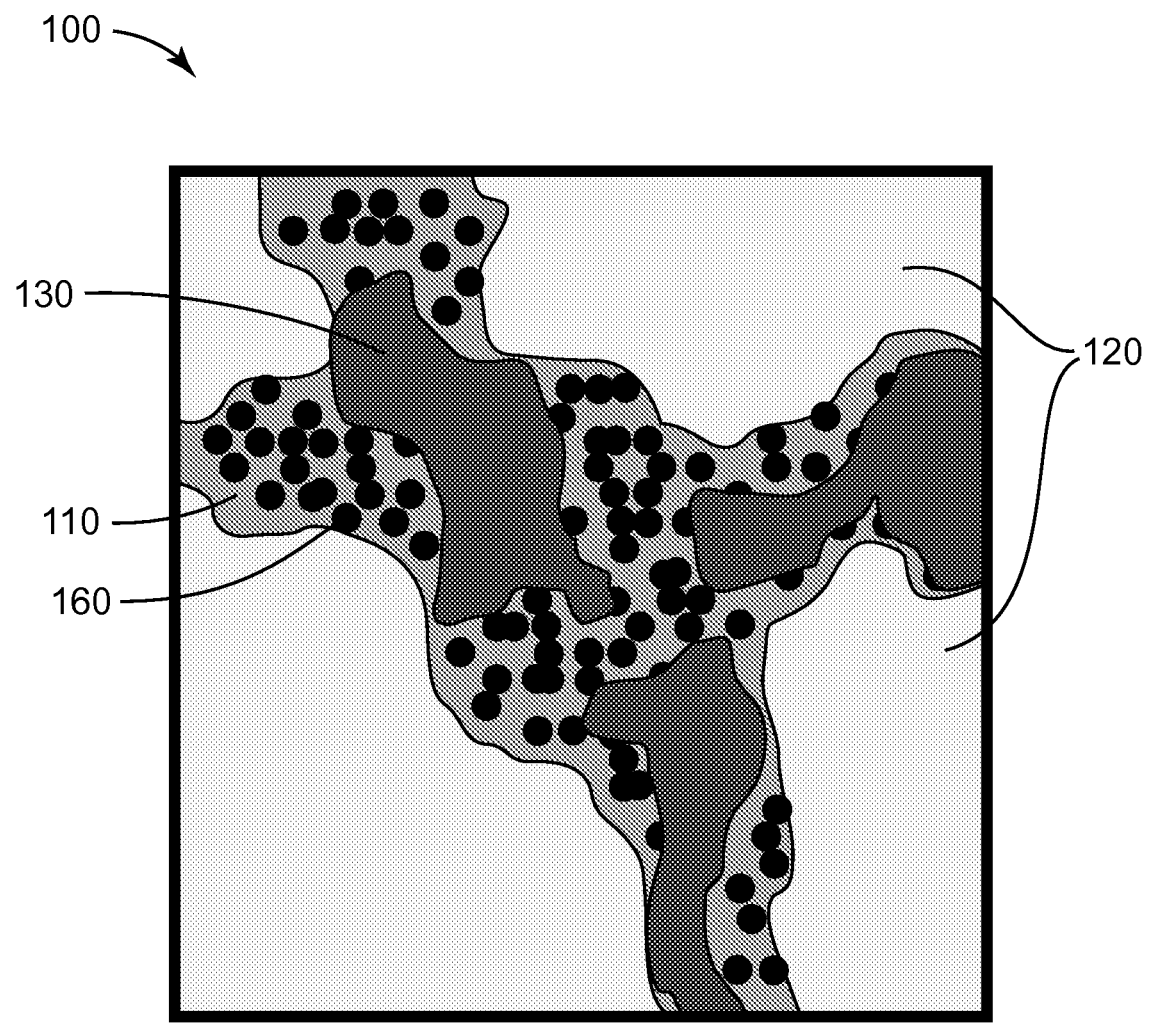
FIG. 1 is a schematic cross-sectional view of a conductive material.

A conducting polymer can be prepared by adding conductive particles, such as carbon black, to an otherwise non-conducting polymer. Above a certain concentration known as the percolation threshold, the conductive particles will form a conductive network resulting in a conductive polymer composite. When particles are added to a polymer blend having two co-continuous phases, the particles may reside predominately in one or the other phase or at the interface between the two phases. When the concentration of particles is high enough, a continuous network of particles can form in the polymer blend. This is referred to as double percolation: percolation of a minor phase polymer in a major phase polymer and percolation of the particles to form a continuous network. However, when conductive particles are added to known polymer composites of this form at a concentration high enough to give a useful conductivity, the polymer composites do not have melt-flow characteristics that allow the composites to be melt-processed and often have a modulus too high for many applications. However, according to the present description, it has been discovered that adding a third polymer that forms a non-continuous phase within the phase containing the conducting particles allows composite materials to be produced that simultaneously have a useful conductivity and are melt-processable and in some embodiments have a low modulus.

It is often the case that dissimilar polymers are immiscible. This is commonly understood in terms of the low entropy of mixing associated with mixing polymers. In some cases certain intermolecular interactions (e.g., hydrogen bonding) between dissimilar polymers can cause the polymers to be miscible in certain concentration and temperature ranges. However, when immiscible blends are desired, dissimilar polymers which do not have interactions that lead to miscibility can be selected based on miscibility tables, known interactions between the moieties of the dissimilar polymers, solubility parameters, or the like.

If the volume fraction of a first polymer in an immiscible blend of the first polymer and a second polymer is low, the first polymer may form disconnected regions within the second polymer. In this case the first polymer would form a discontinuous phase and the second polymer would form a continuous phase. Increasing the volume fraction of the first polymer will often result in percolation of the first polymer thereby forming a continuous phase rather than a discontinuous phase. In this case the first and second polymers form two interpenetrating, co-continuous phases.

Adding a third dissimilar polymer to a blend of two dissimilar polymers will often result in a three phase blend. When a three phase blend is desired, three mutually immiscible dissimilar polymers may be selected in the manner described for immiscible two phase blends. If the volume fraction of the third polymer is low, the third polymer will often form a discontinuous phase predominantly within the first or second polymers. Whether the third polymer will reside predominately in the first polymer or in the second polymer or in a combination of the two is determined by the mutual interactions between the polymer molecules. In many embodiments of the present description, distinct first, second and third polymers are selected such that the first and second polymers are co-continuous and so that the third polymer forms discontinuous regions substantially within the first polymer.

In cases where the thermodynamics strongly favor the third polymer forming a non-continuous phase within the first polymer, the three polymers can be mixed together in a single step and the third polymer will migrate into the first polymer during mixing. In other cases, the third polymer can first be blended with the first polymer and the blend of the first and third polymer then subsequently blended with the second polymer.

Such a three polymer blend can be made conductive by adding conductive particles to the blend. In many embodiments of the present description, conductive particles are selected such that the particles disburse substantially in the first polymer or at the interface between the first and the second polymers. The location of the conductive particles is determined by the interactions between the particles and the polymers. Such interactions can be modified by a suitable surface treatment applied to the particles.

In cases where the thermodynamics strongly favor the conductive particles forming a network within the first polymer or at the interface between the first and second polymers, the conductive particles can be mixed with the polymers in a single step and the conductive particles will migrate into the first polymer or migrate to the interface between the first polymer and the second polymer during mixing. In other cases, the distribution of conductive particles in the first polymer or at the interface between the first and second polymers can be aided by the first mixing the conductive particles with the first polymer and then blending this mixture with the other two polymers. In some embodiments, the first polymer is first mixed with the conductive particles and the mixture of the first polymer and the conductive particles is then blended with the second and third polymer in a single subsequent step. In other embodiments, the first polymer is first mixed with the conductive particles, the mixture of the first polymer and the conductive particles is subsequently blended with the third polymer, and then this blend is subsequently blended with the second polymer. In some embodiments, the conductive particles are surface treated to improve compatibility with the first polymer.

FIG. 1 is a schematic cross-sectional view of conductive material 100. FIG. 1 shows a first continuous phase 110 co-continuous with a second continuous phase 120. First continuous phase 110 includes a first polymer and second continuous phase 120 includes a second polymer different from the first polymer. A plurality of conductive particles 160 is disbursed in first continuous phase 110. A non-continuous phase 130 includes a third polymer different from the first polymer and different from the second polymer. Non-continuous phase 130 is substantially contained within the first continuous phase. In some embodiments, the first continuous phase is a minor continuous phase; i.e., the volume fraction of first continuous phase is less than 50%. In some embodiments, the second continuous phase is a major continuous phase having a volume fraction of more than 50%. In other embodiments, the first continuous phase is a major continuous phase and the second continuous phase is a minor continuous phase. In yet other embodiments, the first continuous phase and the second continuous phase have approximately equal volume fractions.

Conductive particles 160 (shown schematically in FIG. 1) are included at a sufficiently high loading that percolation is achieved. The minimum amount of particles needed for percolation to occur is known as the percolation threshold. The presence of the non-continuous phase reduces the percolation threshold by reducing the volume of the first continuous phase 110 thereby increasing the concentration of the conductive particles in first polymer. In some embodiments, the conductive particles 160 are distributed in the first polymer as indicated in FIG. 1. In other embodiments, the conductive particles are located at or near the interface between the first continuous and second continuous phases. In such cases, the percolation threshold can be lowered since the conductive particles are concentrated in smaller regions.

Since physical properties of the conductive material often depend on the loading of conductive particles, a reduced percolation threshold allows conductive materials to be produced with physical properties that may not otherwise be readily achievable. In the present description, the polymers and conductive particles can be chosen so that the conductive material is melt-processable. As used herein, "melt-processable" material refers to polymers or polymer composites having melt-flow characteristics such that the materials are capable of being melt-processed. For example, melt-processable materials are suitable for use in injection molding. As used herein, an "extrudable material" refers to melt-processable materials that are capable of being extruded through a die or other extrusion component. In many embodiments, the conductive material of the present description is extrudable. The polymers and conductive particles can be chosen such that films or other articles made from the conductive material are flexible and stretchable. The compliance of the conductive material can be described in terms of various moduli, such as the real (G') and imaginary (G") parts of the shear modulus. As used herein, elastic shear modulus refers to the real part of the shear modulus, G', at 20° C. and at a frequency of 1 Hz. In some embodiments, the conductive material has an elastic shear modulus of less than about 1 GPa, less than about 100 MPa, less than about 50 MPa, less than about 30 MPa, less than about 20 MPa, less than about 10 MPa, or less than about 5 MPa. In some embodiments, the conductive material has an elastic shear modulus greater than about 1 MPa or greater than about 5 MPa. In some embodiments, the conductive material has an elastic shear modulus in the range of 5 MPa to 50 MPa or in the range of 5 MPa to 30 MPa.

In many embodiments, the polymers are chosen such that the first and second polymers are immiscible and such that the first and third polymers are immiscible. In many embodiments the polymers are chosen such that the first, second and third polymers are mutually immiscible (i.e., the first and second polymers are immiscible, the first and third polymers are immiscible, and the second and third polymers are immiscible). In some embodiments, the first and third polymers have a lower degree of immisciblity than the second and third polymers. In many embodiments, the first, second and third polymers are each extrudable thermoplastics. Suitable materials for the first, second and third polymers include acrylonitrile butadiene styrene (ABS), acrylics, cellulosics, cyclic olefin co-polymers (COC), olefin block copolymers such as those sold by Dow Chemical under the INFUSE trade name, ethylene vinyl acetate (EVA), ethylene vinyl alcohol (EVOH), polyamides, polyesters, polyurethanes, polypropylene (PP), polyethylene (PE), low-density polyethylene (LDPE), polycarbonate (PC), polyether ether ketone (PEEK), polyethylenimine (PEI), polystyrene (PS), polyvinyl chloride (PVC), fluoropolymers such as polyvinylidene fluoride (PVDF) or polytetrafluoroethylene (PTFE), polysulfone, styrene acrylonitrile (SAN), silicone elastomers, acrylic elastomers, methacrylate copolymers, polyurethanes, polybutadienes, thermoplastic elastomers, polybutadiene-acrylonitrile copolymers, styrene based copolymers such as styrene ethylene butadiene styrene sold by KRATON Polymers under the KRATON trade name, and combinations thereof.

In some embodiments, the first polymer is a styrene based co-polymer. In some embodiments, the second polymer is a thermoplastic elastomer and may be a silicone-based polymer or copolymer and may include polymers or copolymers containing silicone polyoxamide. In some embodiments, the second polymer includes silicone polyoxamide materials comprising polydiorganosiloxane polyoxamide. Suitable silicone polyoxamide materials are described in U.S. Pat. No. 7,371,464 (Sherman et al.), U.S. Pat. No. 7,947,376 (Sherman et al.), U.S. Pat. No. 8,067,094 (Benson et al.), U.S. Pat. No. 7,705,101 (Sherman et al.), U.S. Pat. No. 7,915,370 (Sherman et al.), U.S. Pat. No. 8,063,166 (Sherman et al.), U.S. Pat. No. 8,361,626 (Sherman et al.) and in U.S. Patent App. Pub. No. 2008/0318065 (Sherman et al.), all of which are hereby incorporated herein by reference in their entirety. In some embodiments, the silicone polyoxamide polymers have a molecular weight in the range of 10,000-20,000. In some embodiments, the third polymer may include LDPE, PP, PP ionomer, olefin block copolymers, or methacrylate copolymer.

As used herein, particles refer to any particulate filler and such particles can have the following shapes: spherical or aspherical, flakes, wires or whiskers, rod-shaped, platelets, or other shapes. Conductive particles may be carbon black, carbon fiber, acetylene black, graphene particles, single- or multi-walled carbon nanotubes, metallic particles such as silver, copper or gold flakes or silver, copper or gold nanoparticles, or a combination thereof. In some embodiments, the conductive particles are nanoparticles having at least one dimension less than 1 micron. In some embodiments, the conductive particles have at least one dimension in the range of 10-500 nm or in the range of 10-100 nm. In some embodiments the conductivity of the conductive particles is greater than about 1 S/cm, greater than about 10 S/cm, or greater than about 100 S/cm. As used herein, conductivity and resistivity refer to direct current conductivity and resistivity, respectively, measured at 20° C.

The conductivity of the conductive material can be adjusted by adjusting the concentration of the conductive particles. In some embodiments, the conductive material has a resistivity less than about 100 Ohm-cm, less than about 50 Ohm-cm, less than about 25 Ohm-cm, less than about 15 Ohm-cm, or less than about 10 Ohm-cm. In some embodiments, the conductive material has a conductivity greater than about 0.01 S/m, greater than about 0.05 S/m, greater than about 0.1 S/m, greater than about 0.2 S/m, greater than about 1 S/m, greater than about 2 S/m, or greater than about 3 S/m.

In some embodiments a film is made from the conductive material. Such film can be prepared using an extrusion or co-extrusion process. In some embodiments, the surface resistivity of the conductive material, or the surface resistivity of film made from the conductive material, is less than about 100 kOhm/sq, less than about 10 kOhm/sq, less than about 5 kOhm/sq, less than about 2 kOhm/sq, less than about 1 kOhm/sq, or less than about 600 Ohm/sq.

An ionic liquid additive may be added to the first polymer, to the second polymer, to the third polymer, or to the blend of the first, second and third polymers. The ionic liquid additive can be used to modify the conductivity and/or modify the viscosity of the polymers. In some embodiments, the ionic liquid is an antistat. In some embodiments, the ionic liquid additive is added at a concentration of 1-10 weight percent Suitable ionic liquids include tri-n-butylm-ethylammonium bis-(trifluoromethanesulfonyl)imide available from 3M Company (St. Paul, Minn.) under the trade name FC-4400.

In some embodiments, the conductive materials are co-extruded with an insulating material. The process conditions for co-extrusion can depend upon the materials used for the conductive and insulating layers. Generally, extrusion conditions are chosen to adequately feed, melt, mix and pump the material streams in a continuous and stable manner Final melt stream temperatures are chosen within a range which avoids freezing, crystallization or unduly high pressure drops at the low end of the temperature range and which avoids degradation at the high end of the temperature range. Suitable materials for the insulating layers include the materials listed previously for the first, second and third polymers provided that no conductive particles are added to the polymers or if conductive particles are present, they are present below the percolation threshold. In some embodiments, the insulating material has a bulk resistivity of greater than about $10^6$ Ohm-cm, or greater than about $10^{10}$ Ohm-cm, or greater than about $10^{14}$ Ohm-cm, or greater than about $10^{18}$ Ohm-cm.

The conductive materials are useful in applications where a flexible conductor manufactured by co-extrusion is needed. An example application is Multilayer Electronic Film (MEF) technology as described in U.S. Patent Publication No. 2014-0238731 (Kelley et al.), entitled "Film constructions for Interdigitated Electrodes with Bus Bars and Methods of Making Same," and published Aug. 28, 2014, which is hereby incorporated herein by reference in its entirety.

Figure 6:
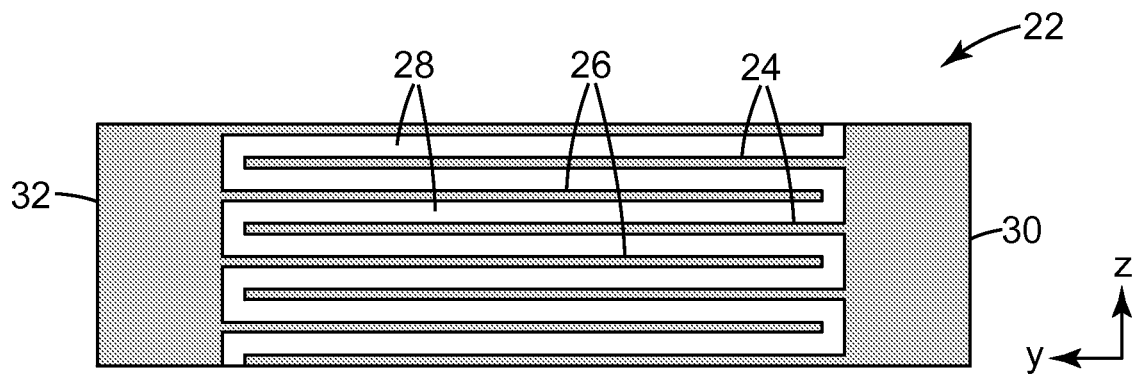
FIG. 6 is a cross-sectional view of a multilayer interdigitated electrode film with exposed electrodes and vertical bus bars.
Figure 7:
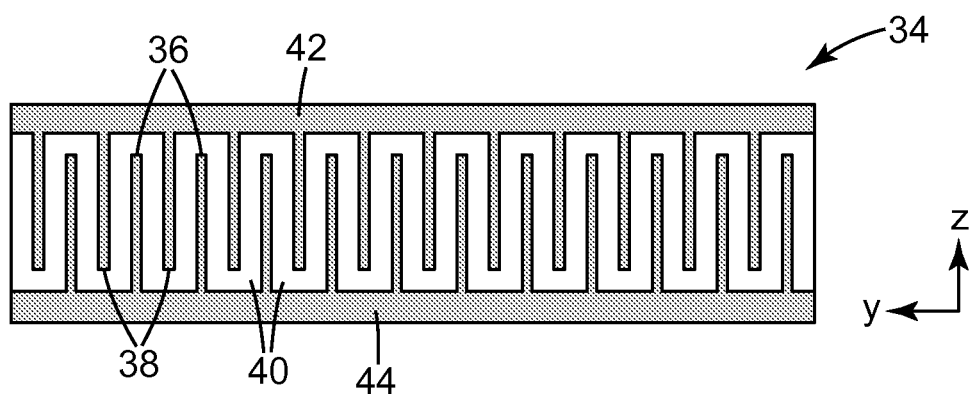
FIG. 7 is a cross-sectional view of a multilane interdigitated electrode film with horizontal bus bars.

FIGS. 6 and 7 show exemplary constructions for multilayer and multilane interdigitated electrode films. As shown, these films have a first major surface, a second major surface opposite the first major surface, and an in-plane direction generally along the first and second major surfaces. The films are described with reference to x-, y-, and z-directions. The x-direction is along the length of the film (or down web direction when making the film), the y-direction is along the width of the film, and the z-direction is along a distance between the first and second major surfaces.

FIG. 6 is a cross-sectional view of a multilayer interdigitated electrode film 22 with exposed electrodes and vertical bus bars. Film 22 includes electrode layers 24 interdigitated with electrode layers 26 between the major surfaces along the in-plane direction. Insulating layers 28 separate electrode layers 24 from electrode layers 26. A bus bar 30 electrically connects and is integrated with electrode layers 24 at one location between the major surfaces of film 22 along the z-direction, for example an edge of film 22. A bus bar 32 electrically connects and is integrated with electrode layers 26 at another location between the major surfaces of film 22 along the z-direction, for example another edge of film 22. Film 22 has exposed electrodes in that insulating layers 28 do not cover the electrode layers 24 and 26 on the outermost layers of the major surfaces of film 22. Electrode layers 24 and 26 and bus bars 30 and 32 can be made by co-extruding the conductive material of the present description with a co-extrudable insulator to form insulating layers 28.

FIG. 7 is a cross-sectional view of a multilane interdigitated electrode film 34 with horizontal bus bars. Film 34 includes electrode layers 36 interdigitated with electrode layers 38 between the major surfaces along the z-direction. Insulating layers 40 separate electrode layers 36 from electrode layers 38. A bus bar 44 electrically connects and is integrated with electrode layers 36 on one major surface of film 34 along the in-plane direction, and a bus bar 42 electrically connects and is integrated with electrode layers 38 on the other major surface of film 34 along the in-plane direction. Electrode layers 36 and 38 and bus bars 42 and 44 can be made by co-extruding the conductive material of the present description with a co-extrudable insulator to form insulating layers 40.

Electrode layers 36 and 38 can be described as vertical planar layers (i.e., substantially in the x-z plane) and electrode layers 24 and 26 can be described as horizontal planar layers (i.e., substantially in the x-y plane). In some embodiments, electrode layers 24 and 26 or electrode layers 36 and 38 may have a curved or otherwise non-planar shape. Insulating layers 28 and 40 have a non-planar shape that includes both vertical and horizontal segments.

Figure 8:
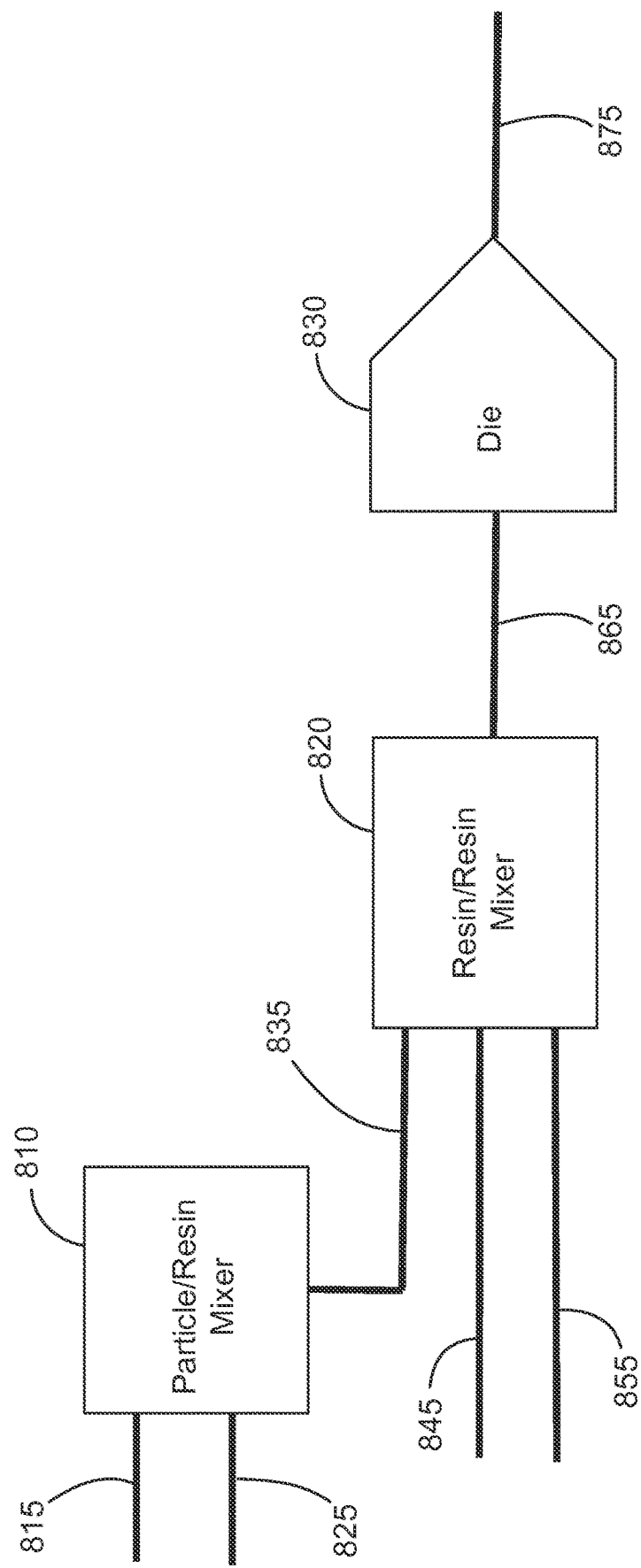
FIG. 8 is a diagram of a system for making an article containing a conductive material.

A method of making an article containing the conductive material of the present disclosure is illustrated in FIG. 8. A first polymer 825 is mixed with conductive particles 815 in a first mixer 810 to form polymer composite 835 which is blended with second polymer 845 and third polymer 855 in second mixer 820 to form conductive material 865. First mixer 810 or second mixer 820 may be a high shear mixer such as a rotor-stator mixer and may be a batch mixer or an inline mixer. In some embodiments, first mixer 810 is a high shear mixer and second mixer 820 is a mixer that provides lower shear rates. Suitable devices for use as first mixer 810 or second mixer 820 are available from Charles Ross & Son Company (Hauppauge, N.Y.). Conductive material 865 is extruded through extrusion die 830 to form article 875. Suitable extrusion dies are described in U.S. Pat. No. 6,767,492 (Norquist et al.) which is herby incorporated herein by reference. Extruded article 875 may be a film and may contain multiple layers.

EXAMPLES

TABLE 1

| | Materials | |
|---|---|---|
| Abbreviation/product name | Description | Obtained from |
| Silicone-14 k | Silicone polyoxamide made using polydimethylsiloxane diamine having a number average molecular weight of about 14,000 | Prepared as described in Preparative Example 5 and Example 16 of U.S. Pat. No. 7,501,185 (Leir et al.) |
| Silicone-15 k | Silicone polyoxamide made using polydimethylsiloxane diamine having a number average molecular weight of about 15,000 | Prepared as described in Example 16 of U.S. Pat. No. 7,501,185 (Leir et al.) except that a polydimethylsiloxane diamine having a number average molecular weight of about 15,000 was used in Preparative Example 5. |
| STAT-TECH | Styrene based copolymer blended with carbon black (CB) particles. Available under the trade name STAT-TECH X80000702703 Black | PolyOne Corporation, Avon Lake, OH |
| PP 6523 | Polypropylene | LyondellBasell Industries, Houston, TX |
| ENGAGE 8200 | Polyethyleneoctene | Dow Chemical, Midland, MI |
| LA 2250 | Methacrylate copolymer available under the tradename KURARITY LA 2250 | Kuraray America Inc., Houston, TX |
| PRIEX 48101 | Polypropylene Ionomer available under the trade name | ADDCOMP North America Inc., Rochester Hills, MI |
| FC-4400 | Ionic liquid antistat | 3M Company, St. Paul, MN |
| INFUSE 9500 | Olefin block copolymer | Dow Chemical, Midland, MI |
| INFUSE 9507 | Olefin block copolymer | Dow Chemical, Midland, MI |
| INFUSE 9100 | Olefin block copolymer | Dow Chemical, Midland, MI |
| Ovation DP 539 | Thermoplastic resin containing multi-walled carbon nanotubes | Ovation Polymers Inc., Medina, OH |
| Ovation DP 578 | Thermoplastic resin containing multi-walled carbon nanotubes | Ovation Polymers Inc., Medina, OH |
| Ovation DP 579 | Thermoplastic resin containing multi-walled carbon nanotubes | Ovation Polymers Inc., Medina, OH |

Examples 1-31

Example blends were prepared using the materials shown in Table 1. Silicone-14k, STAT-TECH, and a third polymer given in Tables 2-5 were added to a BRABENDER Measuring Mixer (C. W. Brabender Instruments, Inc., South Hackensack, N.J.) and melt blended. Blends were prepared in the automatic mode at 230° C. and 78 rpm for 15 minutes. Each blend was melt pressed at 450° F. (232° C.) in a Wabash Genesis 6304-15-LP press with a force setting of 3000 pounds (1.4 metric tons) for 2 minutes. Shims were used to control the thickness of the sample to be about 0.404 mm thick. Each sample was then moved to a separate set of chilled plates on the same press that were kept at about 5-10° C. The shims were moved with the sample in order to keep the thickness of the sample at about 0.404 mm. Each sample was pressed under the chilled plates for 2 minutes at a force setting of 3000 pounds (1.4 metric tons). Roughly circular samples were collected, each having a diameter of roughly 15 cm. Surface resistivities of the samples were measured by using a Delcom 717B instrument (Delcom Instruments, Inc., Minneapolis, Minn.). Six resistivity measurements were made for each sample and the average taken. Bulk conductivities of the samples were determined from the surface resistivity measurements and the thicknesses of the samples. Tables 2-5 summarize material compositions, corresponding estimated carbon black concentrations and the resistivity and conductivity measurements.

TABLE 2

| Example No. | Wt % Silicone-14k | Wt % STAT-TECH | Third Polymer | Wt % Third Polymer | CB wt % | Average Surface Resistivity (Ohms/sq) | Average Bulk Conductivity (S/m) |
|---|---|---|---|---|---|---|---|
| Control A | 0 | 100 | None | 0 | 30 | 106 | 20.45 |
| Control B | 50 | 50 | None | 0 | 15 | 2200 | 0.83 |
| Control C | 55 | 45 | None | 0 | 13.5 | 1531 | 1.15 |
| Control D | 60 | 40 | None | 0 | 12 | 4167 | 0.43 |
| 1 | 55 | 40 | ENGAGE 8200 | 5 | 12 | 4444 | 0.35 |
| 2 | 50 | 40 | ENGAGE 8200 | 10 | 12 | $10^7$ | $2 \times 10^{-4}$ |
| 3 | 50 | 45 | ENGAGE 8200 | 5 | 13.5 | 7366 | 0.26 |
| 4 | 45 | 45 | ENGAGE 8200 | 10 | 13.5 | 1533 | 1.13 |
| 5 | 45 | 50 | ENGAGE 8200 | 5 | 15 | 2756 | 0.72 |
| 6 | 40 | 50 | ENGAGE 8200 | 10 | 15 | 2371 | 0.88 |

TABLE 3

| Example No. | Wt % Silicone-14k | Wt % STAT-TECH | Third Polymer | Wt % Third Polymer | CB wt % | Average Surface Resistivity (Ohms/sq) | Average Bulk Conductivity (S/m) |
|---|---|---|---|---|---|---|---|
| 7 | 55 | 40 | PRIEX 48101 | 5 | 12 | 2778 | 0.66 |
| 8 | 50 | 40 | PRIEX 48101 | 10 | 12 | 7944 | 0.30 |
| 9 | 50 | 45 | PRIEX 48101 | 5 | 13.5 | 4356 | 0.47 |
| 10 | 45 | 45 | PRIEX 48101 | 10 | 13.5 | 1112 | 1.13 |
| 11 | 48 | 50 | PRIEX 48101 | 2 | 15 | 1221 | 1.93 |
| 12 | 45 | 50 | PRIEX 48101 | 5 | 15 | 1105 | 2.14 |
| 13 | 40 | 50 | PRIEX 48101 | 10 | 15 | 1277 | 1.84 |

TABLE 4

| Example No. | Wt % Silicone-14k | Wt % STAT-TECH | Third Polymer | Wt % Third Polymer | CB wt % | Average Surface Resistivity (Ohms/sq) | Average Bulk Conductivity (S/m) |
|---|---|---|---|---|---|---|---|
| 14 | 55 | 40 | PP 6523 | 5 | 12 | 1805 | 1.01 |
| 15 | 50 | 40 | PP 6523 | 10 | 12 | 2482 | 0.96 |
| 16 | 50 | 45 | PP 6523 | 5 | 13.5 | 1523 | 1.52 |
| 17 | 45 | 45 | PP 6523 | 10 | 13.5 | 808 | 2.19 |

TABLE 4-continued

| Example No. | Wt % Silicone-14k | Wt % STAT-TECH | Third Polymer | Wt % Third Polymer | CB wt % | Average Surface Resistivity (Ohms/sq) | Average Bulk Conductivity (S/m) |
|---|---|---|---|---|---|---|---|
| 18 | 45 | 50 | PP 6523 | 5 | 15 | 837 | 2.86 |
| 19 | 40 | 50 | PP 6523 | 10 | 15 | 898 | 2.62 |

TABLE 5

| Example No. | Wt % Silicone-14k | Wt % STAT-TECH | Third Polymer | Wt % Third Polymer | CB wt % | Average Surface Resistivity (Ohms/sq) | Average Bulk Conductivity (S/m) |
|---|---|---|---|---|---|---|---|
| 20 | 55 | 40 | LA 2250 | 5 | 12 | 1408 | 1.28 |
| 21 | 50 | 40 | LA 2250 | 10 | 12 | $10^5$ | 0.02 |
| 22 | 45 | 40 | LA 2250 | 15 | 12 | 7804 | 0.27 |
| 23 | 40 | 40 | LA 2250 | 20 | 12 | 1745 | 1.23 |
| 24 | 45 | 35 | LA 2250 | 20 | 10.5 | 5838 | 0.38 |
| 25 | 50 | 30 | LA 2250 | 20 | 9 | 7338 | 0.27 |
| 26 | 50 | 35 | LA 2250 | 15 | 10.5 | 6664 | 0.22 |
| 27 | 50 | 45 | LA 2250 | 5 | 13.5 | 4460 | 0.53 |
| 28 | 45 | 45 | LA 2250 | 10 | 13.5 | 2278 | 0.78 |
| 29 | 40 | 45 | LA 2250 | 15 | 13.5 | 1462 | 2.34 |
| 30 | 45 | 50 | LA 2250 | 5 | 15 | 1618 | 1.21 |
| 31 | 40 | 50 | LA 2250 | 10 | 15 | 598 | 4.01 |

For each third polymer component considered in Tables 2-5, compositions with three polymer components were found that gave lower resistivity at an equal or lower carbon black loading compared to Control B which did not contain a third polymer. Examples 10 and 23 gave reduced resistivity at a lower carbon black loading, while Examples 18 and 31 gave lower resistivity at an equal carbon black loading compared to Control B.

Figure 2:
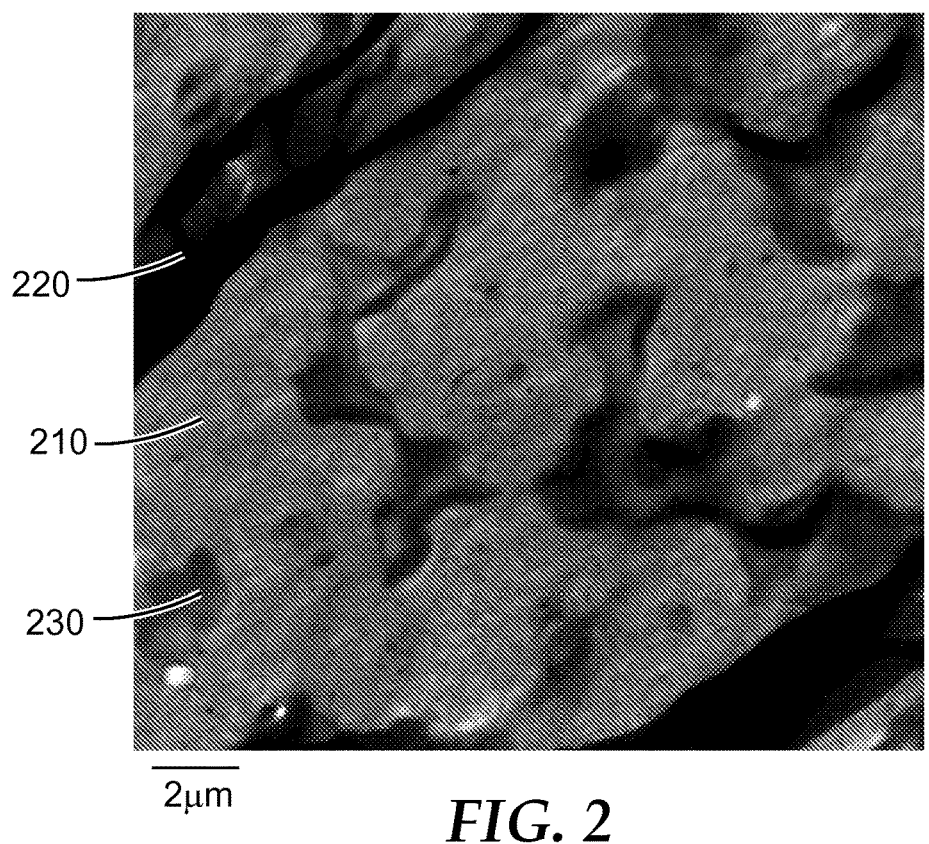
FIG. 2 is a TEM image of a conductive material.
Figure 3:
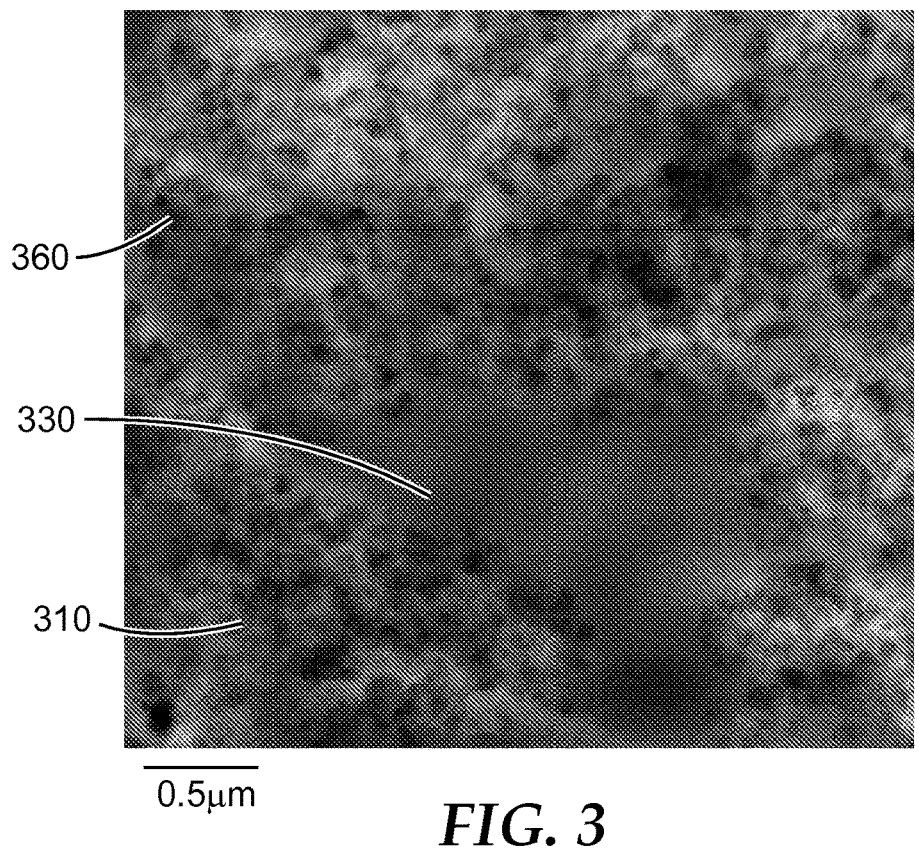
FIG. 3 is a magnified TEM image of the conductive material of FIG. 2.
Figure 4:
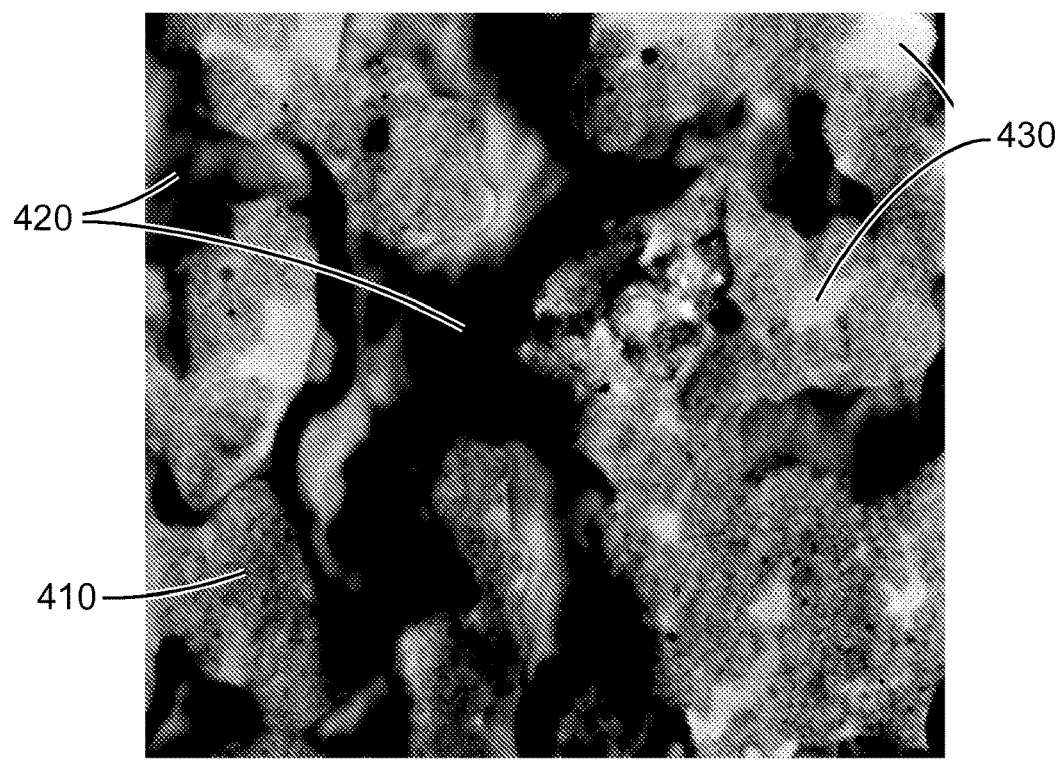
FIG. 4 is a TEM image of a conductive material.
Figure 5:
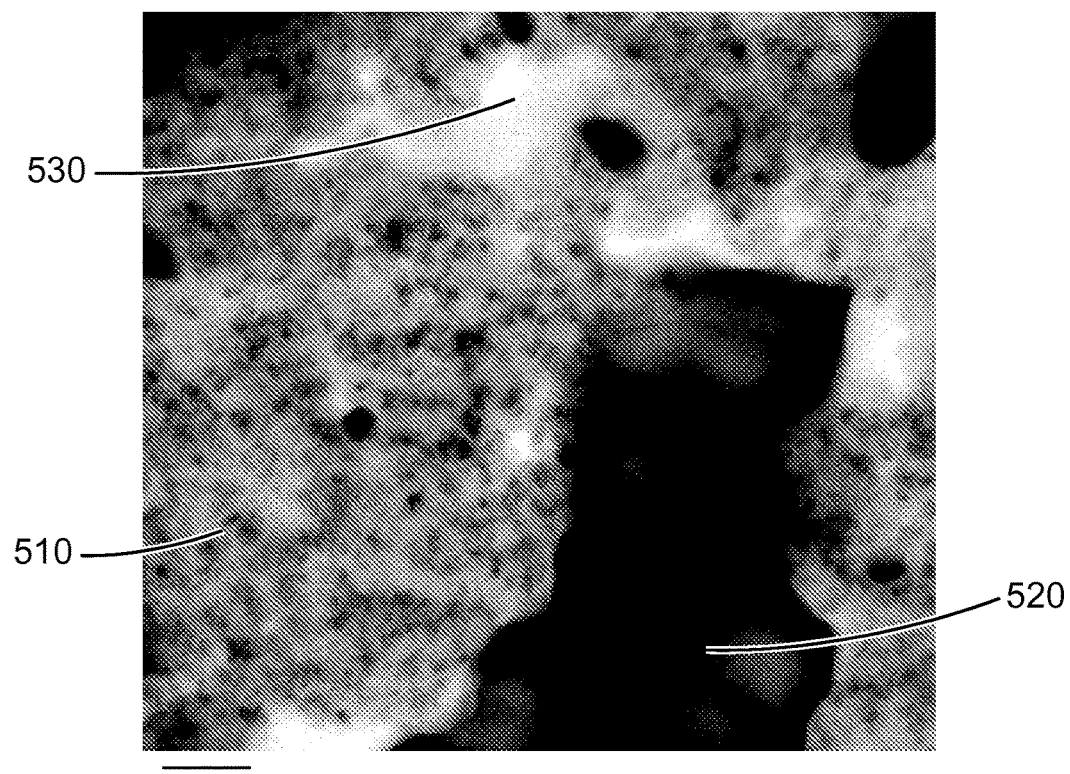
FIG. 5 is a TEM image of a conductive material.

The data in Tables 2-5 indicate that blend compositions had significant non-linear effects on the resistivity which suggests that the resistivity varied with the morphology of the polymeric phases. Transmission electron microscopy (TEM) images of the samples were taken to demonstrate the morphology of the materials. Examples 1-31 consisted of at least two phases plus the carbon black, which appeared to be in the form of flakes and dark round particles. The STAT-TECH polymer (first continuous phase) formed a continuous phase that showed a complicated morphology. TEM analysis suggested that the Silicone-14k phase (second continuous phase) existed as large, randomly shaped, featureless regions. Carbon black did not penetrate into this phase. The third polymer component (non-continuous phase) was seen in some samples as featureless small domains within the STAT-TECH phase (first continuous phase). Representative TEM images are shown in FIGS. 2-5. FIG. 2 shows a TEM image for Example 19 with a length scale of 2 microns indicated in the figure. The second continuous phase (the Silicone-14k phase) 220, the first continuous phase 210 (the STAT-TECH phase) and the non-continuous phase 230 (the PP 6523 phase) can be seen in the image. FIG. 3 shows a magnified TEM image for Example 19 with a length scale of 0.5 microns indicated in the figure. The first continuous phase 310, the non-continuous phase 330 and the conductive particles 360 can be seen in the image. FIG. 4 shows a TEM image for Example 21 with a length scale of 2 microns indicated in the figure. The second continuous phase (the Silicone-14k phase) 420, the first continuous phase 410 (the STAT-TECH phase) and the non-continuous phase 430 (the LA 2250 phase) can be seen in the image. FIG. 5 shows a TEM image for Example 31 with a length scale of 0.5 microns indicated in the figure. The second continuous phase 520, the first continuous phase 510 and the non-continuous phase 530 can be seen in the image.

Mechanical properties of selected samples were characterized by using a Dynamic Mechanical Analysis (DMA) instrument from TA Instruments (New Castle, Del.). Test samples having the geometry of a 20 mm long, 12 mm wide and 0.404 mm thick rectangular bar were cut from the films. All films were tested at a temperature interval of −115° C. to 200° C. at a heating rate of 5° C./minute and at a frequency of 1 Hz. Elastic shear (G') and viscous (G") moduli of samples are given in Table 6. All samples had an elastic shear modulus of less than 100 MPa and many samples had an elastic shear modulus less than about 30 MPa.

TABLE 6

| Example No. | G' (MPa) | G" (MPa) |
|---|---|---|
| Control A | 51.0 | 3.70 |
| Control B | 4.68 | 0.45 |
| 2 | 7.60 | 0.48 |
| 3 | 7.60 | 0.61 |
| 5 | 11.6 | 0.87 |
| 6 | 10.0 | 0.78 |
| 8 | 27.1 | 2.34 |
| 9 | 9.74 | 0.92 |
| 11 | 13.3 | 1.07 |
| 12 | 19.0 | 1.58 |
| 13 | 31.0 | 2.74 |
| 15 | 27.6 | 2.70 |
| 16 | 15.7 | 1.42 |
| 18 | 16.0 | 1.55 |
| 19 | 33.0 | 3.20 |
| 21 | 6.40 | 0.71 |
| 27 | 8.20 | 0.78 |
| 30 | 11.7 | 9.95 |

Examples 32-34

Blends were prepared as in Examples 1-31 except that silicone-15k was used in place of silicone-14k and an antistat was blended with the first, second and third polymers in the BRABENDER Static Mixer in the amount indicated in Table 7. Samples were prepared and conductivity measured as in Examples 1-31. The resulting conductivities are given in Table 7.

TABLE 7

| Example No. | Parts Silicone-15k | Parts STAT-TECH | Third Polymer | Parts Third Polymer | Parts (per 100 parts of the three polymers) FC-4400 | Average Bulk Conductivity (S/m) |
|---|---|---|---|---|---|---|
| 32 | 50 | 45 | LA 2250 | 5 | 2.5 | 1.49 |
| 33 | 50 | 45 | LA 2250 | 5 | 5.0 | 1.49 |
| 34 | 40 | 50 | LA 2250 | 10 | 5.0 | 3.30 |

Examples 35-42

Blends were prepared as in Examples 1-31 except that silicone-15k was used in place of silicone-14k. Samples were prepared and conductivity measured as in Examples 1-31. The resulting conductivities are given in Table 8.

TABLE 8

| Example No. | Wt % Silicone-15k | Wt % STAT-TECH | Third Polymer | Wt % Third Polymer | Average Bulk Conductivity (S/m) |
|---|---|---|---|---|---|
| 35 | 50 | 45 | INFUSE 9500 | 5 | 1.25 |
| 36 | 50 | 40 | INFUSE 9500 | 10 | 0.44 |
| 37 | 45 | 50 | INFUSE 9500 | 5 | 2.59 |
| 38 | 40 | 50 | INFUSE 9500 | 10 | 2.15 |
| 39 | 45 | 50 | INFUSE 9507 | 5 | 2.29 |
| 40 | 40 | 50 | INFUSE 9507 | 10 | 2.79 |
| 41 | 45 | 50 | INFUSE 9100 | 5 | 1.83 |
| 42 | 40 | 50 | INFUSE 9100 | 10 | 1.72 |

Examples 43-48

Blends were prepared as in Examples 32-34 except that a resin containing carbon nanotubes was used in place of the STAT-TECH resin as indicated in Table 9. Samples were prepared and conductivity measured as in Examples 1-31. The resulting conductivities are given in Table 9.

TABLE 9

| Example No. | Parts Silicone-15k | Nanotube-filled resin | Parts nanotube-filled resin | Third Polymer | Parts Third Polymer | Parts (per 100 parts of the three polymers) FC-4400 | Average Bulk Conductivity (S/m) |
|---|---|---|---|---|---|---|---|
| 43 | 40 | Ovation DP 539 | 50 | LA 2250 | 10 | 0 | 1.61 |
| 44 | 40 | Ovation DP 578 | 50 | LA 2250 | 10 | 0 | 0.76 |
| 45 | 40 | Ovation DP 579 | 50 | LA 2250 | 10 | 0 | 0.68 |
| 46 | 40 | Ovation DP 539 | 50 | LA 2250 | 10 | 5 | 1.22 |
| 47 | 40 | Ovation DP 578 | 50 | LA 2250 | 10 | 5 | 0.92 |
| 48 | 40 | Ovation DP 579 | 50 | LA 2250 | 10 | 5 | 0.69 |

Although specific embodiments have been illustrated and described herein, it will be appreciated by those of ordinary skill in the art that a variety of alternate implementations can be used for the specific embodiments shown and described without departing from the scope of the present disclosure. This application is intended to cover any adaptations or variations of the specific embodiments discussed herein.

What is claimed is:

1. A conductive material, comprising:
    a first continuous phase comprising a first polymer composition;
    a second continuous phase comprising a second polymer composition different from the first polymer composition, the second continuous phase co-continuous with the first continuous phase;
    a non-continuous phase comprising a third polymer composition different from the first polymer composition and different from the second polymer composition, the non-continuous phase substantially contained within the first continuous phase; and
    a plurality of conductive particles distributed in the first polymer composition or at a boundary between the first continuous phase and the second continuous phase,
    wherein the conductive particles form a conductive network and wherein the conductive material is melt-processable.

2. The conductive material of claim 1, wherein the conductive particles are distributed in the first polymer composition.

3. The conductive material of claim 1, wherein the conductive particles are distributed at the boundary between the first continuous phase and the second continuous phase.

4. The conductive material of claim 1, wherein the conductive particles are spherical particles, rod-shaped particles, flakes, platelets or a combination thereof.

5. The conductive material of claim 1, wherein the conductive particles comprise particles selected from the group consisting of carbon black, carbon nanotubes, graphene particles, carbon fibers, silver flakes, and silver nanoparticles.

6. The conductive material of claim 1, wherein the conductive material has a shear modulus less than about 100 MPa.

7. The conductive material of claim 6, wherein the conductive material has a shear modulus less than about 10 MPa.

8. The conductive material of claim 1, wherein the conductive material is extrudable.

9. The conductive material of claim 1, wherein the conductive material has a bulk conductivity of at least 0.1 S/m.

10. The conductive material of claim 9, wherein the conductive material has a bulk conductivity of at least 1 S/m.

11. A film comprising the conductive material of claim 1.

12. The film of claim 11, wherein the film comprises a plurality of layers and wherein at least one of the plurality of layers comprises the conductive material and at least one of the plurality of layers comprises an insulating material.

13. The conductive material of claim 1, wherein the second polymer composition comprises a silicone-based polymer.

14. A method of making an article, comprising the steps of:
    selecting a first polymer composition, a second polymer composition and a third polymer composition such that the first polymer composition, the second polymer composition and the third polymer composition are mutually immiscible;
    forming a polymer composite by mixing the first polymer composition with a plurality of conductive particles;
    blending the polymer composite, the second polymer composition and the third polymer composition to form a conductive material; and
    extruding the conductive material;
    wherein the conductive material comprises:
        a first continuous phase comprising the first polymer composition;
        a second continuous phase comprising the second polymer composition, the second continuous phase co-continuous with the first continuous phase; and
        a non-continuous phase comprising the third polymer composition;
    and wherein the conductive particles form a conductive network.

15. The method of claim 14, wherein the non-continuous phase is substantially contained within the first continuous phase.

16. The method of claim 14, wherein the plurality of conductive particles are distributed in the first polymer composition or at a boundary between the first continuous phase and the second continuous phase.

17. The method of claim 14, wherein the extruding step comprises co-extruding a plurality of layers and at least one of the plurality of layers comprises the conductive material and at least one of the plurality of layers comprises an insulating material.

18. The method of claim 14, wherein the extruding step comprises co-extruding a plurality of horizontal planar layers.

19. The method of claim 14, wherein the extruding step comprises co-extruding a plurality of vertical planar layers.

20. The method of claim 14, wherein the extruding step comprises extruding or co-extruding at least one non-planar layer.

* * * * *